United States Patent [19]
Davis

[11] 3,825,124
[45] July 23, 1974

[54] FILTER ELEMENTS FOR CONTINUOUS FILTERS

[75] Inventor: Steven S. Davis, Bountiful, Utah

[73] Assignee: Envirotech Corporation, Salt Lake City, Utah

[22] Filed: July 27, 1970

[21] Appl. No.: 275,513

[52] U.S. Cl................. 210/330, 210/333, 210/402
[51] Int. Cl...................... B01d 33/34, B01d 33/02
[58] Field of Search .......... 210/217, 333, 356, 402, 210/395, 391, 404, 403, 411

[56] References Cited
UNITED STATES PATENTS

| | | | |
|---|---|---|---|
| 1,878,998 | 9/1932 | Akins............................. | 210/330 X |
| 1,895,276 | 1/1933 | Cole................................ | 210/356 X |
| 2,271,814 | 2/1942 | Coolidge........................ | 210/411 X |
| 3,326,382 | 6/1967 | Bozek et al..................... | 210/356 |
| 3,500,991 | 3/1970 | Vogt............................... | 210/330 X |

FOREIGN PATENTS OR APPLICATIONS

| | | | |
|---|---|---|---|
| 1,237,366 | 6/1960 | France........................... | 210/330 |
| 1,080,523 | 4/1960 | Germany........................ | 210/404 |

*Primary Examiner*—Frank A. Spear, Jr.
*Attorney, Agent, or Firm*—Robert R. Finch; Robert E. Krebs

[57] ABSTRACT

A plurality of concave filtering elements are fixed about the periphery of a rotary filter drum so that the mouths of the elements are open and the closed ends of the elements are directed substantially radially inward of the drum. As the drum rotates in submergence in a slurry, solids are collected in the elements by applying suction to the elements to draw the liquid therethrough; to discharge the collected solids, the elements are everted by reversing the pressure thereon.

9 Claims, 12 Drawing Figures

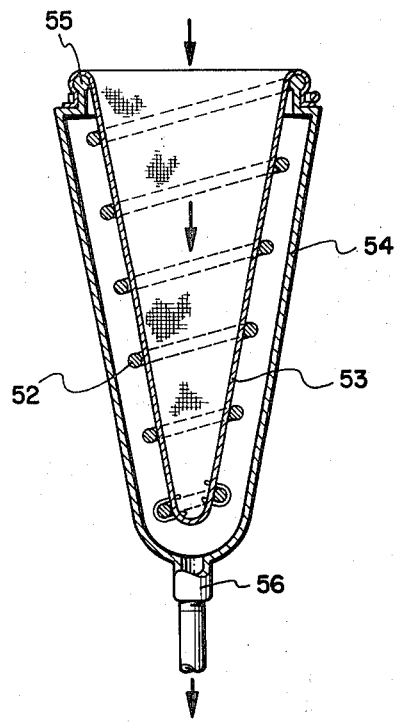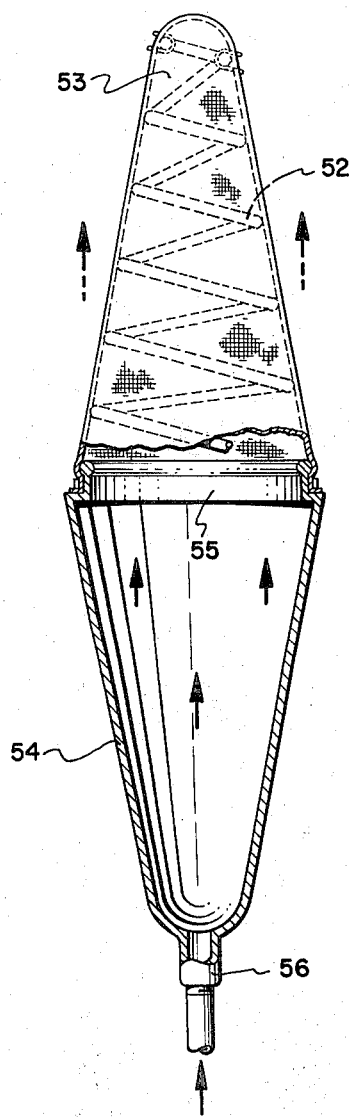
FIG. 11
FIG. 12

FILTER ELEMENTS FOR CONTINUOUS FILTERS

BACKGROUND OF THE INVENTION

1. Field of the Invention

This invention relates to the filtration of solids from liquids and, more particularly, to continuous vacuum filtration operations.

2. State of the Art

Vacuum filtration is a widely utilized method for mechanically removing solids from liquid. It generally comprises applying vacuum (i.e., suction) to one face of a sheet of porous filtering medium whose other face is exposed to a liquid to be filtered. The medium retains the solids but allows the liquid (filtrate) to pass through.

Continuous filtration is sometimes achieved by either securing filter medium tautly to the curved sidewall of a drum or training a filter belt about the drum and then rotating the drum in partial submergence in a slurry while concurrently applying vacuum to the immersed sections of the drum. The vacuum causes a cake of solids to form on the filter medium overlying the immersed sectors. The solids cake typically is removed, as by scraping, as the drum rotates around and before the sector is reimmersed in the slurry.

A problem with such arrangements is that the filter medium may blind or become clogged by residual solids. To minimize blinding, it is known to blow air back through the filter medium to dislodge the residue from the pores of the filter medium; blowing back air is sometimes referred to as pressure discharge hereinafter.

OBJECTS OF THE INVENTION

An important object of the invention is to provide a plurality of separable, replaceable filter medium elements on a continuous filter;

Another object is to provide a rotary drum vacuum filter having increased filtration area for a given drum size;

Still another object is to provide improved solids discharge from a rotary drum vacuum filter;

Yet another object is to provide a filter medium arrangement on a rotary drum vacuum filter which minimizes blinding and clogging of the filter medium.

SUMMARY OF THE INVENTION

According to the invention, a plurality of individual filtering elements are utilized on a modified rotary drum of an otherwise typical rotary drum vacuum filter. Each of the filtering elements is formed of flexible filter medium shaped to form a concave body having an open end or mouth; preferably the diameter of the mouth is less than the length of the body. The drum is modified to have spaced-apart apertures formed through its peripheral sidewall of appropriate size for receiving the bodies of the filtering elements and means are provided to secure the mouths of the elements in open condition into the apertures so that the bodies of the filtering elements extend substantially radially inward of the drum. In one manner of operation the drum is rotated partially submerged in a slurry so that the filtering elements successively move into and out of immersion in the slurry. Vacuum is applied to the submerged filtering elements causing suspended solids from the slurry to collect within the concave body while filtrate passes therethrough. After a filtering element is carried by drum rotation out of the slurry, air is drawn through the solids cake to effect drying and then a reverse flow of pressurized air is directed against the element to cause it to evert through its open end thereby forcefully expelling the collected solids.

BRIEF DESCRIPTION OF THE DRAWINGS

The present invention may be better understood by referring to the following description and appended drawings which are offered by way of illustration only and not in limitation of the invention, the scope of which is defined by the claims and equivalents and not by any preceding description. In the drawings:

FIGS. 11 and 12 are elevational views, partially cutaway and enlarged for clarity, of two positions of a filtering element with modified accompanying structure.

DETAILED DISCLOSURE

Figure 1:
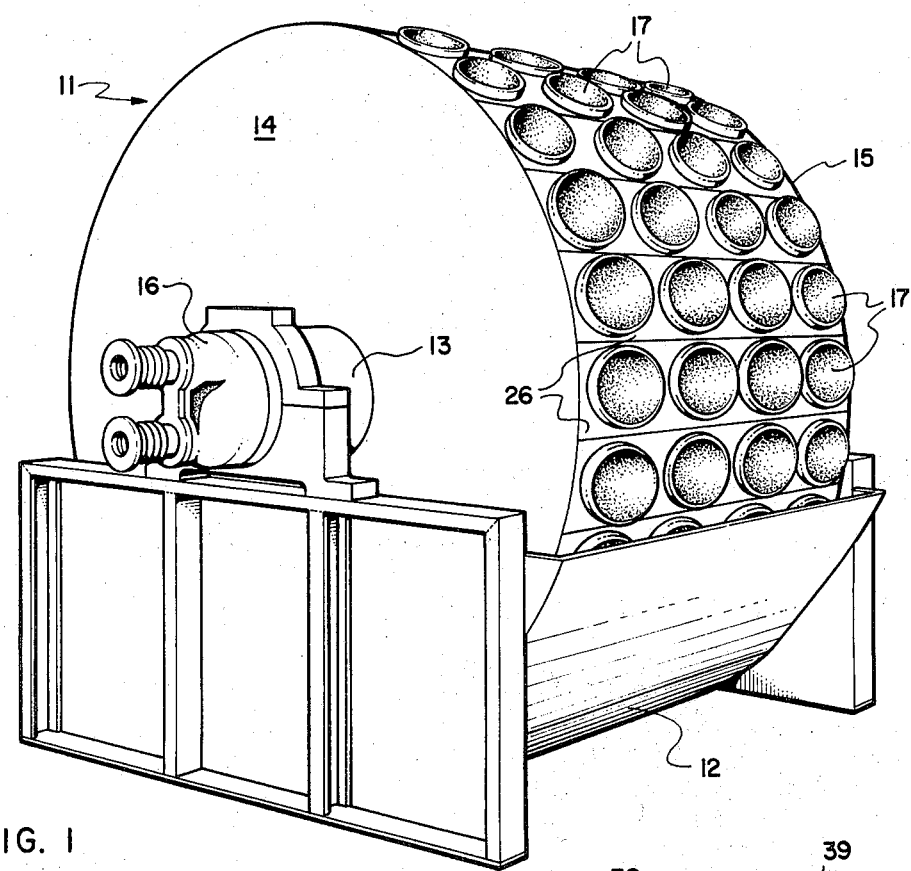
FIG. 1 is a pictorial view of one type of rotary drum filter incorporating the invention.

The filter of FIG. 1 includes a horizontally-disposed drum 11 which is rotatably supported for partial submergence in a tank 12 by trunnions extending from the heads 14 and 15 of the drum. Only trunnion 13 at the forward head 14 of the drum can be seen in the drawing. A feed of solids suspended in a liquid (e.g., a slurry) is continuously introduced to the tank through appropriate inlets which are not shown. The drum is driven to rotate on the trunnions by a suitable drive means (not shown) so that successive longitudinally-running sections at the drum's curved periphery, or sidewall, move successively into and out of submergence in the slurry. A complex of piping is arranged inside the drum so that each sector is connected sequentially to a rotary valve 16 which, in turn, selectively delivers vacuum or pressure to a sector at the drum sidewall according to the sector's angular position relative to the tank. Typically vacuum is applied to the submerged sectors to effect vacuum filtration and, after the sectors emerge from the slurry, continued vacuum effects further dewatering or drying; then a reverse flow of high pressure air discharges the cake. The drum drive, the tank, and the rotary valve mentioned in this paragraph are of conventional construction.

According to the invention, the drum 11 is modified from its conventional construction and novel filtering elements are provided for use therewith. More specifically, the drum 11 is modified so that in place of the usual sector extending between the drum ends there is provided in the drum sidewall between such ends a plurality of individual enlarged apertures and a separate filtering element 17 is secured into each of the apertures. The filtering elements, as will be explained further herein, each have an elongate concave or conoidlike body which is made of flexible filter medium and which has one open end or mouth whose diameter is preferably less than the length of the body. As shown in FIG. 1, the mouths are secured in open condition to the sidewall of the drum and the bodies of the elements extend inward of the drum.

Various structural arrangements can be provided at the drum sidewall to support the individual filtering elements and to communicate vacuum and pressure thereto. In one arrangement, elongate troughs generally designated 21 in FIG. 2 comprise sectors of the drum sidewall. Each trough has downward convergent walls 22 and 23, a generally planar top 26, and open ends. A plurality of the troughs are arranged side-by-side as shown on the drum of FIG. 1 so that the adjacent top walls 26 of the troughs define the nearly circular sidewall or shell for the drum. The trough ends are fixed to the opposed drum heads 14 and 15 and are closed thereby. The planar top 26 of each of the troughs 21 has a series of large, generally equally spaced-apart apertures formed therethrough into which filtering elements are secured.

Figure 2:
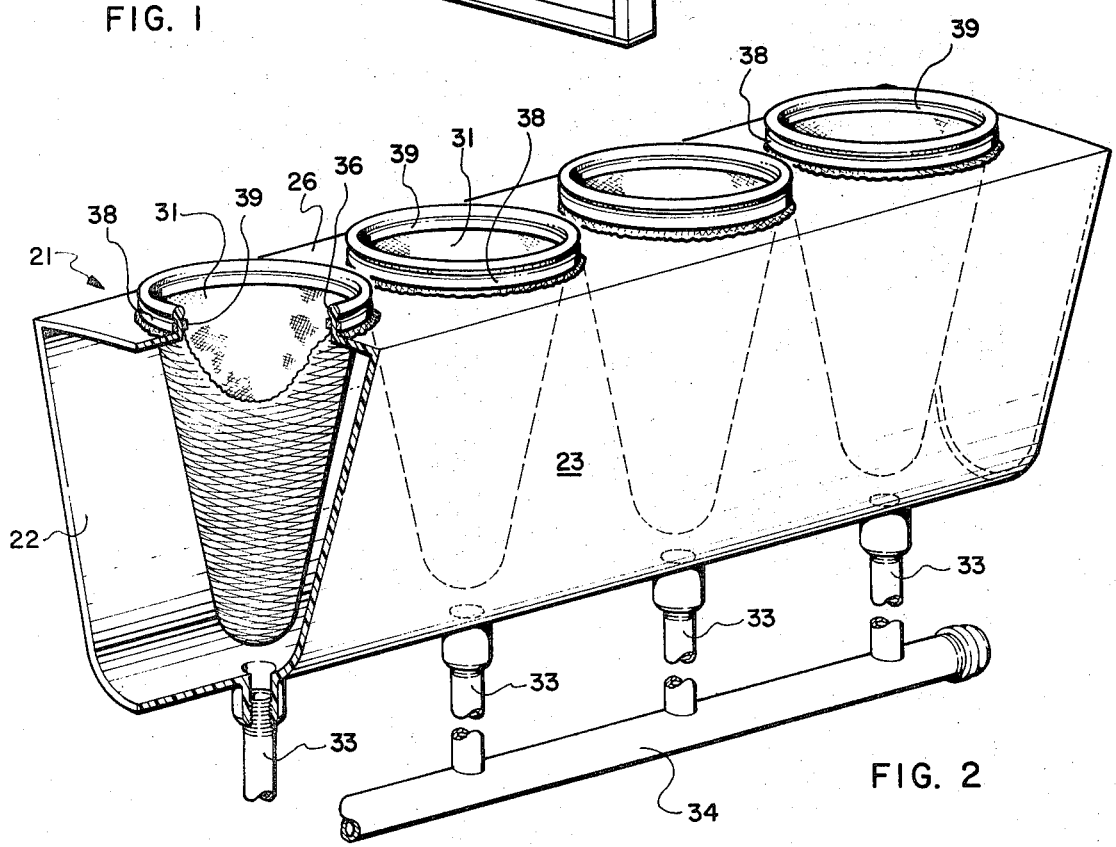
FIG. 2 is a detail, drawn in perspective and enlarged for clarity, of one of the sections at the periphery of the filter of FIG. 1 partially cut away.

The filtering elements 31 in FIG. 2 are to be considered merely a particular embodiment of the filtering elements designated generally 17 in FIG. 1. Each of the particular filtering elements 31 is made of flexible filter medium shaped to form a concave body (more particularly, the body of the element 31 has the shape of a right-circular conoid) with one open end or mouth; preferably the diameter of the mouth is less than the length or depth of the body proper. Cloth made from natural or synthetic fibres is a generally suitable filter medium.

Pipes 33 extend from the bottom of the trough 21 below each of the filtering elements 31 to connection to a common manifold 34. One such manifold 34 is usually provided to connect each trough 21 to the rotary valve 16 (FIG. 1) which, in turn, is conventionally connected to vacuum and pressure sources (not shown). Filtrate drains from the troughs through the manifolds during vacuum filtration and, after filtration is completed, the manifolds can communicate pressurized air to the troughs.

Various arrangements may be utilized to secure the mouth of a filtering element into an aperture in the drum sidewall. In FIG. 2, for example, flange 37 fixedly extend outwardly around each of the apertures in the top wall 26 of the trough 21 and the mouth of the filtering element 31 is everted back over the flange and secured therearound by a clamp ring 38 while a second ring 39 secures the filtering element against the inner wall of the flange.

Figure 3:
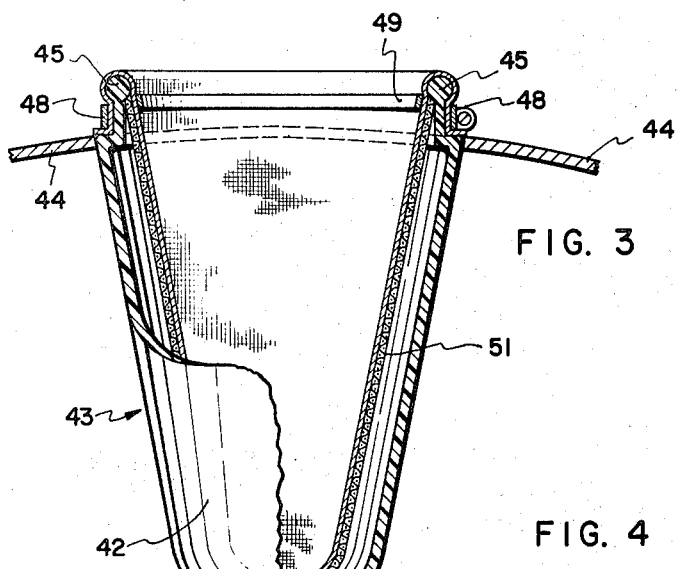
FIG. 3 is an alternative embodiment of the detail shown in FIG. 2, partially broken away and incorporating additional structure.
Figure 4:
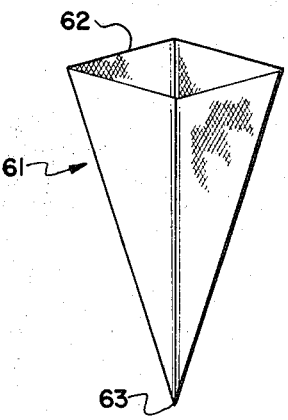
FIGS. 4–8 illustrate various modifications of filtering elements for use with the filter of FIG. 1.
Figure 5:
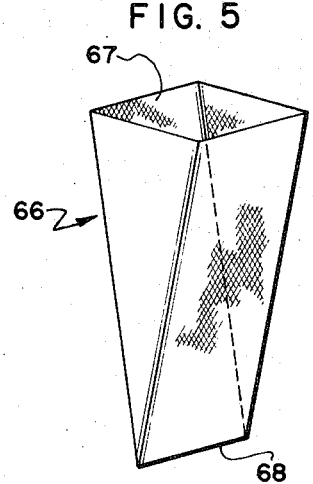
Figure 6:
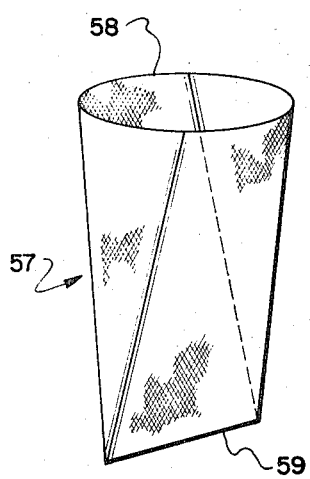
Figure 7:
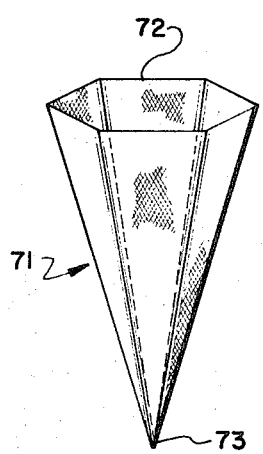
Figure 8:
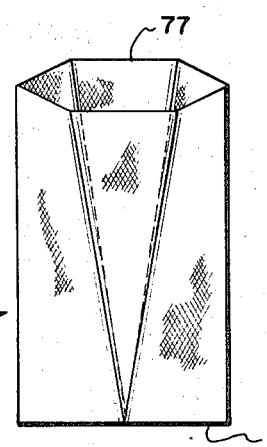

The filtering elements may be supported at the drum periphery by structure other than the above-described troughs 21. For example, FIG. 3 shows a rigid conical member 43 which is fixed into an aperture in the drum sidewall 44 and a filtering element 42 is secured into the conical member. The exterior appearance of the drum with a plurality of such arrangements is the same as that shown in FIG. 1 but, of course, the conical members 43 rather than the troughs 21 underlie the sidewall and form an individual vacuum chamber therebeneath. Filtering element 42 is generally the same as the previouslydescribed filtering elements 31 shown in FIG. 2. A pipe 46 extends from the smaller end of each of the conical members for drainage and, for the conical members which are in a row transversely across the drum, the pipes 46 may be connected to a common manifold 47 which then extends to the rotary valve.

In FIG. 3, the filtering member 42 is secured into the conical member 43 in substantially the same manner as the filtering members 31 are secured into the trough 21 in FIG. 2. That is, the conical member 43 is provided with an extending flange 45 surrounding its large end and the mouth of the filtering element 42 is everted back over the flange and secured therearound by a clamp ring 48 while a second ring 49 secures the filtering element against the inner wall of the flange.

For applications involving fairly high vacuum, auxiliary means may be provided to support each of the filtering elements. In FIG. 3 such means are shown as a perforated member 51 which is supported from flange 45 to form a sheath around the filtering element 42. The perforated member has substantially the same configuration as the filtering element 42 and may be either rigid or flexible. In a particular modification of the invention useful in special circumstances, the support members could be integral with the filtering elements by incorporating flexible strengthening material such as strands of nylon, plastic, fiber-glass, or the like, into the fabric of the filter elements.

Another special modification of the invention which may be useful to support, and retract, the conoidal filtering elements is shown in FIGS. 11 and 12 wherein a conical volute spring 52 forms a support around a filtering element 53 fitted into conical member 54. The filtering element 53 and the conical member 54 are substantially the same as the corresponding previously described structure designated 42 and 43 in FIG. 3. The filtering element and the spring are both fixed to the flange 55 which supports the filtering element 53 at the larger end of the conical member 54. The filtering element and the spring may be fixed to each other so that when the filtering element everts under pressure discharge, as in FIG. 12, the spring follows. The spring then helps the filtering element to retract from its everted condition.

Although the filtering elements in FIGS. 2 and 3 have the shape of a circular conoid, other configurations may be utilized, some of which are shown in FIGS. 4 through 8. The filtering element 57 in FIG. 6, for example, has a circular mouth 58 but its body converges to a linear bottom 59. The mouths for the elements shown in FIGS. 4, 5, 7 and 8 have various polygonal configurations and the bottoms of the elements are alternatively linear or pointed. The element 61 in FIG. 4 has, for example, a pyramidal body including a rectangular mouth 62 and a pointed bottom 63.

The various configurations differ somewhat in detail, but they all may be described as being concave with an elongate body. Although some of the configurations result in relatively greater filtration or wall area than others, wall area is not the sole criteria for selecting a particular configuration. An important consideration is how the elements can be arranged to achieve maximum utilization of the surface area of the drum. The circular-mouthed elements leave unused areas on the drum periphery while the filtering elements with hexagonal or rectangular mouths nest closely.

Figure 10:
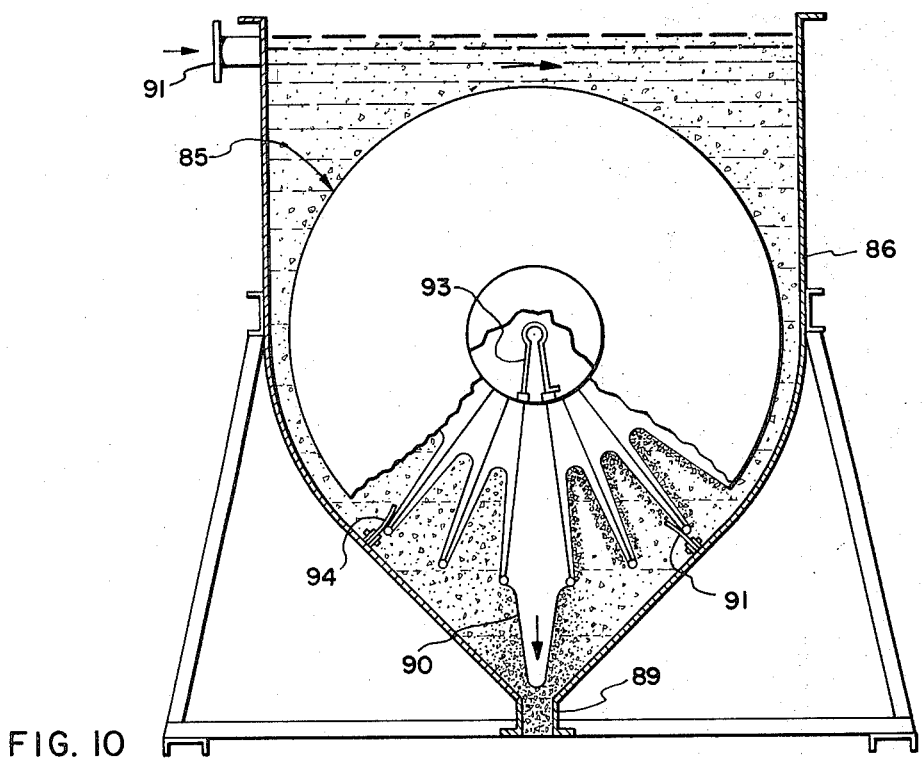

Any of the previously-described filtering elements are readily and advantageously used on other types or arrangements of rotary drum filters than the one shown in FIG. 1. In FIG. 10, for example, the filter elements are arranged on a rotary drum generally designated 85 which is totally immersed in slurry in a tank 86. Discharge is downward into the slurry above an outlet pipe 89 (the filtering element 90 above the outlet is illustrated in the discharge condition). Because of the fluid pressure in the tank, filtration effectively proceeds with reduced vacuum or none at all. Other apparatus illustrated in FIG. 10 includes a feed inlet 91 through which slurry is carried into the tank 86, and a stationary shoe 93 which bridges the lowermost sectors of the rotating drum and acts as a valve to apply air under pressure thereto to effect pressure discharge. When pressurized air is delivered across the bridged sectors, the filtering elements evert and the solids discharged therefrom settle into the bottom of the tank as a thickened sludge for discharge via the outlet pipe 89. The filter thus functions primarily as a thickening mechanism. Seals 94 may be required to seal around the bottom sectors on the drum to prevent excessive turbulence.

Figure 9:
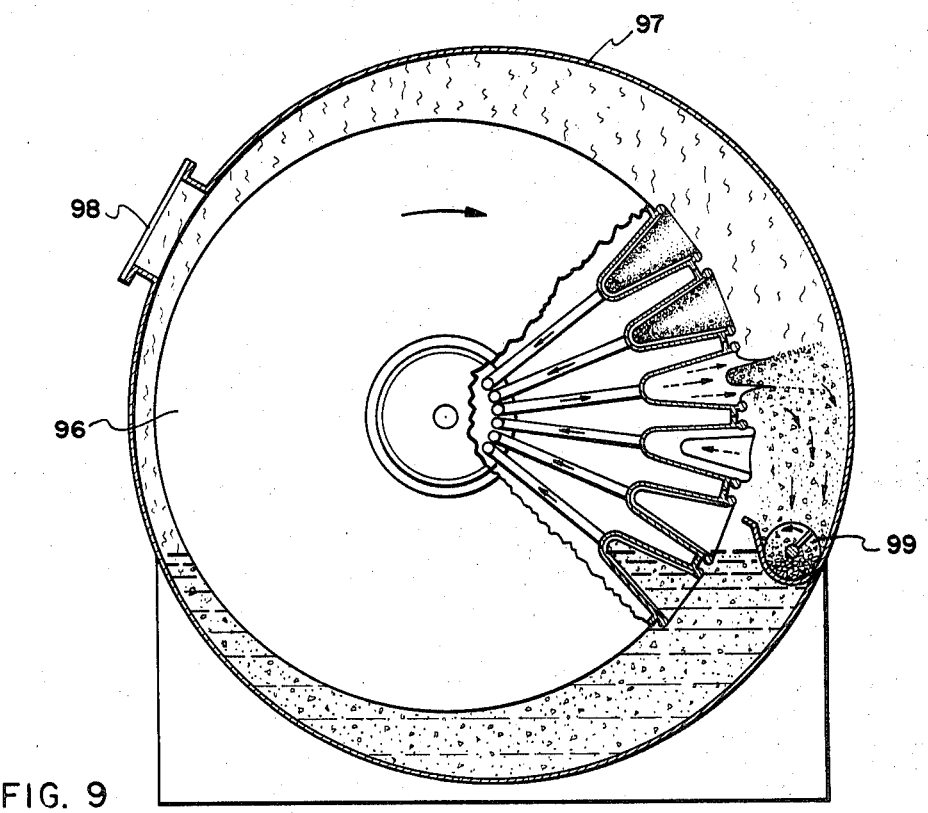
FIGS. 9 and 10 illustrate two other types of rotary drum filters incorporating the invention, the filters being shown schematically and in section.

FIG. 9 shows a rotary drum 96 arranged within a closed tank 97 which holds a captive steam atmosphere above a body of liquid to be filtered. The housing 97 may be provided with a filtering element replacement port 98. The pressurized atmosphere helps to compress the solids on the filter medium and to maintain the filter members extended into the drum. Solids which are discharged under pressure from the elements are caught in a scroll or screw-type conveyor mechanism 99. Following discharge the steam pressure aids in retracting the elements before they are again immersed in the slurry. Such an arrangement is useful where toxic fumes, explosive vapors, and/or air pollution problems exist.

The operation of the inventive apparatus can best be understood by assuming the drum 11 in FIG. 1 to be rotating and considering one of the concave filtering elements slightly after it is immersed in slurry in the tank 12. Upon the application of suction via rotary valve 16 to that filtering element, the element extends radially inward of the drum. In such condition, filtrate flows through the element and solids deposit therein. Usually the solids evenly coat the inside of the element. If the arrangement shown in FIG. 2 is used, the filtrate first passes into trough 21, thence through outlet pipes 33 to manifold 41. From the manifold the filtrate flows to the rotary valve 16, FIG. 1, for discharge. After rotation of the drum has carried an element out of submergence, pressurized air is directed against the outside of the element causing it to evert. FIG. 12 shows, for example, filtering element 53 everted. The abrupt eversion of the filtering element together with the air flowing therethrough causes the solids to be discharged. The flexing of the element while it everts minimizes blinding of the filtering element fabric.

I claim:

1. A rotary drum filter comprising:
   a. a tank adapted to hold a body of slurry;
   b. a drum mounted in said tank for rotation therein about the drum axis;
   c. a plurality of apertures formed through the curved sidewall of said drum between the ends thereof and in spaced relationship;
   d. a plurality of individual filtering elements each of which has an elongate concave body which is made from flexible filter medium and which has one open end whose diameter is less than the length of said body;
   e. means securing said open end of one of said elements into each of said apertures in said sidewall so that said bodies of said elements may extend substantially radially inward of the drum;
   f. means for establishing a pressure differential across said aperture between the outside of said drum and the inside thereof; and
   g. means for selectively reversing said pressure differential thereby to evert said bodies of said filtering elements through their respective apertures.

2. A rotary drum filter according to claim 1 wherein said means securing said open ends into said apertures includes outwardly extending flanges fixed to the drum sidewall surrounding each of said apertures and said open ends are wrapped back over said flanges and are fixed thereto.

3. A rotary drum filter according to claim 1 further including means for supporting the bodies of each of said filtering elements when said elements are extended inward of the drum, said support means comprising a perforate, substantially inelastic sheath which surrounds said filtering element and which is supported from said drum sidewall.

4. A rotary drum filter according to claim 1 wherein said means for establishing a pressure differential across said apertures comprises piping disposed within said drum to communicate vacuum to said filtering elements.

5. A rotary drum filter according to claim 1 further including means for supporting the bodies of each of said filtering elements when said elements are extended inward of the drum, said support means comprising a conical spring which surrounds said filtering element body and which is fixed at side drum sidewall.

6. A rotary drum filter according to claim 1 wherein said drum is mounted for total submergence in the slurry held in said tank.

7. A rotary drum filter according to claim 1 in which said means for establishing a pressure differential across said apertures comprises a plurality of chambers formed inside said drum with at least one of said apertures providing communication between the interior of one of said chambers and the outside of said drum, and there is provided piping interconnecting each of said chambers with a source of reduced pressure.

8. A rotary drum filter according to claim 7 in which communication between each chamber and the exterior of said drum is provided through a single aperture.

9. A rotary drum filter according to claim 7 in which each of said chambers communicates with the exterior of said drum simultaneously through a plurality of apertures.

* * * * *